United States Patent
Endo et al.

(10) Patent No.: US 9,323,787 B2
(45) Date of Patent: Apr. 26, 2016

(54) COMPUTER-READABLE RECORDING MEDIUM STORING SYSTEM MANAGEMENT PROGRAM, DEVICE, AND METHOD

(71) Applicant: FUJITSU LIMITED, Kawasaki-shi, Kanagawa (JP)

(72) Inventors: Susumu Endo, Kawasaki (JP); Shugo Nakamura, Yokohama (JP); Masaki Ishihara, Kawasaki (JP); Takayuki Baba, Kawasaki (JP); Masahiko Sugimura, Meguro (JP); Yusuke Uehara, Kawasaki (JP); Daiki Masumoto, Kawasaki (JP); Hirohisa Naito, Fuchu (JP); Akira Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/713,611

(22) Filed: Dec. 13, 2012

(65) Prior Publication Data
US 2013/0191407 A1 Jul. 25, 2013

(30) Foreign Application Priority Data
Jan. 25, 2012 (JP) ................................. 2012-013018

(51) Int. Cl.
*G06F 17/30* (2006.01)

(52) U.S. Cl.
CPC .... *G06F 17/30274* (2013.01); *G06F 17/30247* (2013.01)

(58) Field of Classification Search
None
See application file for complete search history.

(56) References Cited

U.S. PATENT DOCUMENTS

| 7,035,873 | B2 * | 4/2006 | Weare | |
| 8,577,131 | B1 * | 11/2013 | Li et al. | 382/159 |
| 2007/0192300 | A1 * | 8/2007 | Reuther et al. | 707/3 |
| 2012/0054194 | A1 * | 3/2012 | Gao et al. | 707/741 |

FOREIGN PATENT DOCUMENTS

| JP | 2008-131377 | 6/2008 |
| JP | 2011-70408 | 4/2011 |

* cited by examiner

*Primary Examiner* — Kimberly Wilson
*Assistant Examiner* — Pedro J Santos
(74) *Attorney, Agent, or Firm* — Oblon, McClelland, Maier & Neustadt, L.L.P.

(57) ABSTRACT

A computer-readable recording medium storing a program for causing a computer to execute a procedure for managing a system that retrieves a image corresponding to a first type specified by a retrieval request received from a terminal device and another image corresponding to a second type associated with the first type, from an image database storing a plurality of images associated with at least a number of a plurality of types, the procedure includes: referring to a learning state representing whether feature values of images corresponding to each of the plurality of the types have been obtained; retrieving an unlearned type in which the feature value has not been obtained, among the plurality of types; specifying an association type associated with the unlearned type; and outputting the unlearned type in accordance with the learning state of the association type.

18 Claims, 16 Drawing Sheets

FIG. 2

| TYPE ID | IMAGE INFORMATION |
|---|---|
| A | file_001,file_002 ⋯ file_008 |
| B | file_010 ⋯ file_020 |
| C | file_021 ⋯ file_030 |
| D | file_031 ⋯ file_051 |
| ⋮ | ⋮ |
| F | file_100,file_101 ⋯ file_105 |

FIG. 4

| TYPE ID | LEARNING STATE |
|---------|----------------|
| A | 0 |
| B | 0 |
| C | 1 |
| D | 0 |
| E | 0 |
| F | 0 |
| ⋮ | ⋮ |
| L | 0 |
| ⋮ | ⋮ |

| TYPE ID | HIGHER-LEVEL TYPE ID |
|---------|----------------------|
| A | - |
| B | A |
| C | A |
| D | B |
| E | B |
| F | B |
| ⋮ | ⋮ |
| L | F |
| ⋮ | ⋮ |

| TYPE ID | HISTORY INFORMATION |
|---|---|
| A | 100 |
| B | 200 |
| C | 300 |
| D | 300 |
| E | 10 |
| F | 300 |
| ⋮ | ⋮ |
| L | 100 |
| ⋮ | ⋮ |

| LINK SOURCE TYPE ID | LINK DESTINATION TYPE ID | HIGHER-LINK COUNT | LOWER-LINK COUNT | TERMINATION FLAG |
|---|---|---|---|---|
| F | B | 0 | 0 | 0 |
| F | L | 0 | 0 | 0 |
| F | M | 0 | 0 | 0 |
| F | N | 0 | 0 | 0 |

FIG. 11B

| LINK SOURCE TYPE ID | LINK DESTINATION TYPE ID | HIGHER-LINK COUNT | LOWER-LINK COUNT | TERMINATION FLAG | |
|---|---|---|---|---|---|
| F | B | 1 | 0 | 0 | ~1300 |
| F | L | 0 | 1 | 0 | |
| F | M | 0 | 1 | 0 | |
| F | N | 0 | 1 | 0 | |

FIG. 11C

| LINK SOURCE TYPE ID | LINK DESTINATION TYPE ID | HIGHER-LINK COUNT | LOWER-LINK COUNT | TERMINATION FLAG | |
|---|---|---|---|---|---|
| F | B | 1 | 0 | 0 | ~1300 |
| F | L | 0 | 1 | 0 | |
| F | M | 0 | 1 | 0 | |
| F | N | 0 | 1 | 0 | |
| B | A | 1 | 0 | 0 | ~1310 |
| B | D | 1 | 0 | 0 | ~1320 |
| B | E | 1 | 0 | 0 | ~1330 |

FIG. 12A

| LINK SOURCE TYPE ID | LINK DESTINATION TYPE ID | HIGHER-LINK COUNT | LOWER-LINK COUNT | TERMINATION FLAG | |
|---|---|---|---|---|---|
| F | B | 1 | 0 | 1 | ~ 141 |
| F | L | 0 | 1 | 0 | |
| F | M | 0 | 1 | 0 | |
| F | N | 0 | 1 | 0 | |
| B | A | 2 | 0 | 0 | ~ 142 |
| B | D | 1 | 1 | 0 | |
| B | E | 1 | 1 | 0 | |

FIG. 12B

| LINK SOURCE TYPE ID | LINK DESTINATION TYPE ID | HIGHER-LINK COUNT | LOWER-LINK COUNT | TERMINATION FLAG | |
|---|---|---|---|---|---|
| F | B | 1 | 0 | 1 | |
| ... | ... | ... | ... | ... | |
| B | A | 2 | 0 | 1 | |
| ... | ... | ... | ... | ... | |
| A | C | 2 | 1 | 0 | ~ 143 |
| ... | ... | ... | ... | ... | |

FIG. 13

| UNLEARNED TYPE ID | SHORTEST DISTANCE | EVALUATION VALUE |
|---|---|---|
| F | 3 | 4 |
| ... | ... | ... |
| A | 1 | 2 |

135

COMPUTER-READABLE RECORDING MEDIUM STORING SYSTEM MANAGEMENT PROGRAM, DEVICE, AND METHOD

CROSS-REFERENCE TO RELATED APPLICATION

This application is based upon and claims the benefit of priority of the prior Japanese Patent Application No. 2012-013018, filed on Jan. 25, 2012, the entire contents of which are incorporated herein by reference.

FIELD

The embodiments discussed herein are related to a technique of managing images according to types of features of the images.

BACKGROUND

In general, image retrieval is performed on a number of managed images. For example, Japanese Laid-open Patent Publication No. 2008-131377 discloses a technique of classifying images so as to manage the images. When image retrieval is performed, an image classified by a user is supplied to the user as a result of the retrieval.

Furthermore, Japanese Laid-open Patent Publication No. 2011-70408 discloses a technique of retrieving an image which matches a keyword through the Internet and associating the keyword and the image as a technique of collecting images. For example, an image classification device collects images in a plurality of HTML pages including a keyword and calculates image feature values of the images. Thereafter, the image classification device performs clustering on a plurality of images in accordance with a distribution characteristic in a feature space and stores images included in a cluster corresponding to small dispersion as images associated with a specified keyword.

SUMMARY

According to an aspect of the invention, a computer-readable recording medium storing a program for causing a computer to execute a procedure for managing a system that retrieves a image corresponding to a first type specified by a retrieval request received from a terminal device and another image corresponding to a second type associated with the first type, from an image database storing a plurality of images associated with at least a number of a plurality of types, the procedure includes: referring to a learning state representing whether feature values of images corresponding to each of the plurality of the types have been obtained; retrieving an unlearned type in which the feature value has not been obtained, among the plurality of types; specifying an association type associated with the unlearned type; and outputting the unlearned type in accordance with the learning state of the association type.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a table image of an image database;

FIG. 4 is an image diagram illustrating a table configuration of a learning state table;

FIG. 5 is an image diagram illustrating a table configuration of a configuration table;

FIG. 7 is an image diagram illustrating a table configuration of a history table;

FIGS. 11A, 11B and 11C are image diagrams illustrating a link table;

FIGS. 12A and 12B are image diagrams illustrating the link table;

FIG. 13 is an image diagram illustrating a table configuration of a distance table.

DESCRIPTION OF EMBODIMENTS

Figure 1:
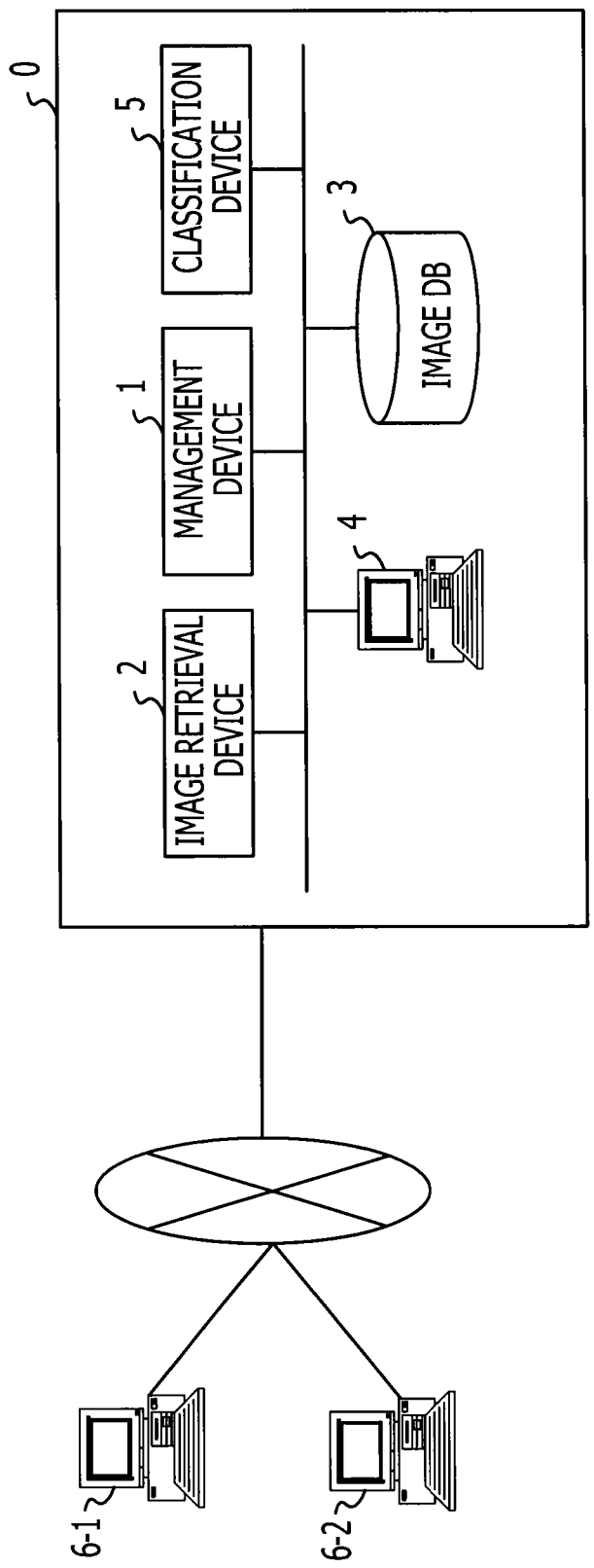
FIG. 1 is a diagram illustrating a configuration of an image management system according to an embodiment.

As illustrated in Japanese Laid-open Patent Publication No. 2008-131377, when images are retrieved from a database which stores images and types which are associated with each other, a searcher intends to obtain images as many as possible. Therefore, an administrator of an image retrieval device is requested to store images associated with types in the image database as many as possible. Note that the types represent information used to identify image features such as categories. Examples of the types include names of objects included in the images and names of states.

Furthermore, it is considered that, in a configuration of the image database, since a large number of images are associated with types, the images and the types are classified using an image classification technique.

For example, to add an image to the image database, the image classification device disclosed in Japanese Laid-open Patent Publication No. 2011-70408 may be used. Specifically, it is considered that the image classification device collects images of corresponding HTML pages in response to an input type serving as a keyword, associates the collected images and the input type with each other, and stores the associated images and the type in the image database.

However, there arises a problem in that the related technique disclosed in Japanese Laid-open Patent Publication No. 2011-70408 is not applied to images other than the images included in the HTML pages. That is, since the image classification device associates images included in HTML pages and types, images which are not associated with HTML pages are not associated with types.

Therefore, it is considered that features of images to be classified according to the types are learned in advance. Specifically, the image classification device determines types of images by comparing features learned for individual types in advance with a feature extracted from an image to be newly added to the image database.

As described above, by learning features of types in advance, a type can be automatically assigned to a newly-obtained image. Since it is expected that the number of images corresponding to types is increased, a number of images are supplied to the user as many as possible.

However, a large number of types of images are generally classified and managed in the image database, and therefore, learning of features of all the types in advance takes a considerably long period of time. This is because a large number of images associated with types of learning targets are to be collected for the learning of features.

Therefore, it is preferable that features of all types are not simultaneously learned but features of some of the types are simultaneously learned, and the others of types which have not been learned are successively learned where appropriate.

Accordingly, an object of the disclosed technique of this embodiment is to specify types of features to be preferentially learned among types of features which have not been learned.

Hereinafter, embodiments of the present technique will be described in detail. Note that the embodiments described hereinafter may be combined with each other as long as contents of processes are not conflicted.

FIG. 1 is a diagram illustrating a configuration of an image management system according to an embodiment. An image management system 0 includes a management device 1, an image retrieval device 2, an image database 3 (hereinafter referred to as an "image DB 3"), an administrator terminal 4, and a classification device 5. The management device 1, the image retrieval device 2, the image DB 3, and the administrator terminal 4 perform wired communication or wireless communication with one another.

Note that the management device 1 and the administrator terminal 4 may be realized by the same device. Furthermore, the image retrieval device 2 may have a function of the management device 1. Moreover, the management device 1 may have a function of the classification device 5.

The image management system 0 communicates with retrieval terminals 6-1 and 6-2 (hereinafter collectively referred to as a "retrieval terminal 6") through a network. Examples of the network include communication networks such as the Internet, a mobile telephone network, and a telephone network. The communication network may be a wired communication network or a wireless communication network.

The image DB 3 is a storage device which stores images and types which are associated with each other. FIG. 2 is a diagram illustrating a table image of the image DB 3. The image DB 3 stores image information and type IDs which are associated with each other. Note that a process of the association is performed by the classification device 5. The association process will be described in detail hereinafter.

The image information is used to identify images. For example, the image information is file names of images or paths to images. Alternatively, image files themselves may be stored.

The type IDs are values uniquely assigned to types. The types represent information used to identify image features such as categories. When a plurality of images are classified according to objects included in the images, for example, the type IDs are assigned to the objects included in the images. Furthermore, when a plurality of images are classified according to states of the images, the type IDs are assigned to individual scenes.

Referring back to FIG. 1, the classification device 5 is a computer which stores the image information and the types which are associated with each other in the image DB 3. The image information and the types are associated with each other in accordance with an instruction issued by an administrator. Specifically, the classification device 5 accepts inputs of types of images from the administrator terminal 4. Note that the inputs may be obtained by character strings corresponding to the types or by specifying types from display of a list of all types. Thereafter, the classification device 5 associates the image information of the images with the types input so as to correspond to the images and stores the image information and the types in the image DB 3.

As another method for associating image information with types employed in the classification device 5, a method for associating images with types using features learned in advance may be employed. Note that the learning of features of images to be classified according to types represents calculation of feature values of the features. The feature values are obtained by converting features of images into vectors, and in this embodiment, the feature values are used for classification according to types.

Note that distribution of the feature values of the individual types may be learned instead of the feature values. Specifically, by calculating ranges in which images to be classified according to types are to be included, when a feature value of an image is newly added, the probabilities that the added feature value belongs to the individual types can be obtained.

When the image management system 0 newly obtains an image, the classification device 5 performs a process of associating the image with a type. The classification device 5 obtains a feature value A of the newly-obtained image. Thereafter, the classification device 5 compares a feature value B of a certain type which has been obtained in advance with the feature value A so as to determine whether the new image is to be assigned to the type corresponding to the feature value B. When a difference between the feature value B and the feature value A is equal to or smaller than a threshold value, for example, the classification device 5 associates the image corresponding to the feature value A with the type corresponding to the feature value B.

Furthermore, in the case where distribution of feature values is learned, in the distribution of the feature values of types, a type corresponding to the probability of existing of the feature value corresponding to the feature value A which is equal to or larger than the threshold value is associated with the image corresponding to the feature value A and stored in the image DB 3.

Here, when a feature value corresponding to the feature value A of the newly-obtained image is not similar to any of feature values B which are obtained in advance or when the existing probability is low in any of distributions of the feature values, a type is not associated with the newly-obtained image. Specifically, the classification device 5 is not capable of storing the newly-obtained image and the type in the image DB 3 in a state in which the image is associated with the type.

Therefore, when a feature value of a certain type has not been learned and a newly-obtained image is to be associated with one of the types and stored in the image DB 3, a situation in which the image DB 3 is not capable of managing the image by associating the image with a type occurs. To avoid this situation, the management device 1 described below supports the administrator of the image management system 0 in a situation in which feature values of individual types are to be calculated.

The management device 1 is a computer which manages the image management system 0. For example, the management device 1 separately stores types having feature values which have been obtained and types in which feature values thereof have not been obtained. Furthermore, among the types in which feature values have not been obtained, a type in which a feature value is to be preferentially obtained is output.

The image retrieval device 2 is a computer which searches the image DB 3 in accordance with a retrieval request supplied from the retrieval terminal 6. The retrieval request includes a keyword which specifies a type of a retrieval target.

The administrator terminal 4 is a computer which is operated by the administrator which manages the image management system 0. For example, the administrator terminal 4 displays information on a type output from the management device 1. Furthermore, the administrator terminal 4 instructs a device (not shown) which obtains feature values to obtain a feature value corresponding to a certain type. For example, the administrator specifies the displayed type as a type of a target of calculation of a feature value.

Note that a general method is used as a method for calculating a feature value. For example, when calculating a feature value of a certain object, the computer which calculates feature values collects a group of images which reliably include the object and a group of images which do not include the object. Thereafter, the computer extracts features of the individual image groups and calculates the feature value of the object from the extracted features.

Figure 3:
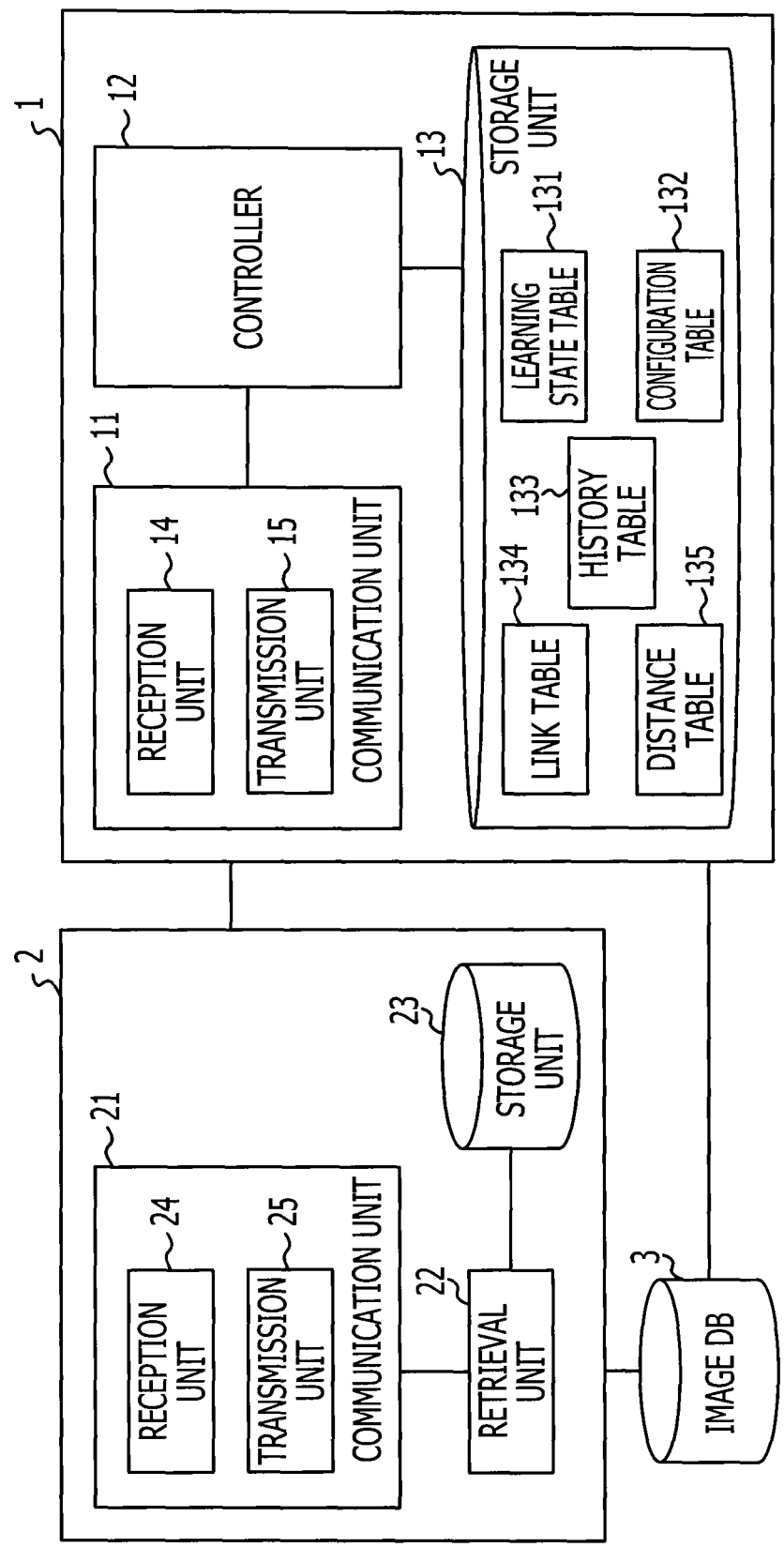
FIG. 3 is a functional block diagram illustrating a management device and an image retrieval device.

FIG. 3 is a functional block diagram illustrating the management device 1 and the image retrieval device 2.

The management device 1 includes a communication unit 11, a controller 12, and a storage unit 13. The communication unit 11 includes a reception unit 14 and a transmission unit 15. The storage unit 13 stores a learning state table 131, a configuration table 132, a history table 133, a link table 134, a distance table 135, and the like. Note that these tables may be stored in physically different storage units. For example, the learning state table 131, the configuration table 132, and the history table 133 may be stored in a first storage unit and the link table 134 and the distance table 135 may be stored in a second storage unit.

The communication unit 11 is a processor used to communicate with other devices. For example, the communication unit 11 transmits and receives data by communicating with the image retrieval device 2, the administrator terminal 4, and the image DB 3. Specifically, the reception unit 14 receives data from the other devices. The transmission unit 15 transmits data to the other devices.

The controller 12 is a processor which specifies a type in which a feature value is to be preferentially obtained among the types in which feature values have not been obtained. Note that the types which have feature values are determined as learned types and the types in which feature values have not been obtained are determined as unlearned types hereinafter. For example, as for the unlearned types, when a type linked to an unlearned type is also an unlearned type, the controller 12 specifies the unlearned type as a type in which a feature value is to be preferentially obtained.

The storage unit 13 stores the various tables and various threshold values. The learning state table 131, the configuration table 132, and the history table 133 will be described. Note that the link table 134, the distance table 135, and the various threshold values will be described hereinafter along with a description of a processing flow. Furthermore, the learning state table 131, the configuration table 132, and the history table 133 are described as different tables hereinafter but may be the same table.

FIG. 4 is an image diagram illustrating a table configuration of the learning state table 131. The learning state table 131 stores type IDs and learning states which are associated with each other. The type IDs are values uniquely assigned to types. The learning states are information representing whether feature values of the types corresponding to the type IDs have been obtained.

In the example of FIG. 4, the learning state table 131 stores flags representing whether learning has be done as the learning states. A flag "0" represents that a type having a type ID corresponding to the flag "0" is an unlearned type. On the other hand, a flag "1" represents that a type having a type ID corresponding to the flag "1" is a learned type. For example, in FIG. 4, a type of a type ID "A" is an unlearned type.

Note that obtained feature values which are associated with the learned type may be stored as the learning states. However, learning states corresponding to the unlearned type are blank.

FIG. 5 is an image diagram illustrating a table configuration of the configuration table 132. The configuration table 132 stores type IDs and higher-level type IDs which are associated with each other. A higher-level type ID is assigned to a type defined in a higher level relative to a certain type when the types constitute a tree structure.

Figure 6:
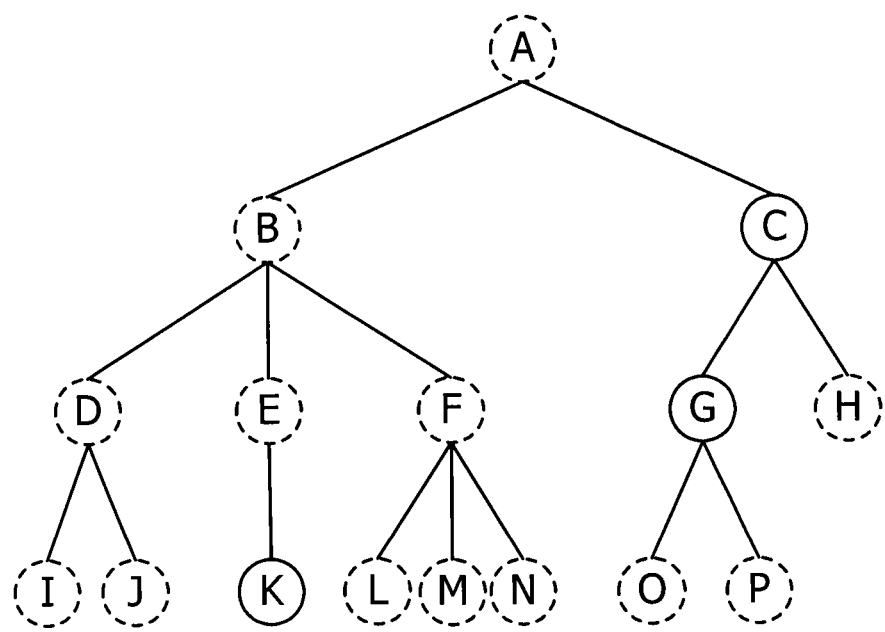
FIG. 6 is a diagram illustrating a configuration of types.

Referring now to FIG. 6, a tree structure of this embodiment and the higher-level type IDs will be described. FIG. 6 is a diagram illustrating a configuration of types. Characters surrounded by solid circle and characters surrounded by dashed circle represent types corresponding to various type IDs. The solid circles represent learned types whereas the dashed circles represent unlearned types. In the example of FIG. 6, the type "A" represents an unlearned type.

In the tree structure, a type which is associated with a certain type and which is defined in a lower level relative to the certain type is semantically included in the higher level type. Therefore, the administrator of the image management system 0 defines higher-level type IDs corresponding to the tree structure in the configuration table 132.

For example, in FIG. 6, types "L", "M", and "N" are defined as lower-level types relative to a type "F". For example, when the type "F" represents "passenger car", the types "L", "M", and "N" represent types of passenger car. Furthermore, types "D", "E", and "F" are defined as lower-level types relative to a type "B". For example, when the type "B" represents "car", the types "D", "E", and "F" represent types of car. For example, the type "D" represents "truck". Furthermore, types "B" and "C" are defined as lower-level types relative to the type "A". For example, when the type "A" represents "vehicle", the types "B" and "C" represent types of vehicle. For example, the type "C" represents "train".

In FIG. 5, types defined as higher-level types relative to certain types are stored. For example, when the higher-level type ID "B" relative to the type "F" has been stored, the type "B" is located in a higher level relative to the type "F" in the tree structure illustrated in FIG. 6.

FIG. 7 is an image diagram illustrating a table configuration of the history table 133. The history table 133 stores the type IDs and history information which are associated with each other.

The history information represents retrieval history of the types corresponding to the type IDs. Specifically, the history information relates to history of retrieval performed by the image retrieval device 2 in response to retrieval requests. Note that the history information is periodically output from the image retrieval device 2 to the management device 1. In the example of FIG. 7, the numbers of times a retrieval process is performed are stored as the history information. Note that, instead of the numbers of times a retrieval process is performed, the latest retrieval date and times may be stored. In the example of FIG. 7, the retrieval process is performed "100" times on a type corresponding to the type ID "A".

Referring back to FIG. 3, a functional configuration of the image retrieval device 2 will be described. The image retrieval device 2 includes a communication unit 21, a retrieval unit 22, and a storage unit 23. The communication unit 21 includes a reception unit 24 and a transmission unit 25.

The communication unit 21 is a processor used to communicate with other devices. For example, the communication unit 21 transmits data to and receives data from the management device 1, the administrator terminal 4, and the image DB 3. The reception unit 24 receives data from the other devices. The transmission unit 25 transmits data to the other devices.

The retrieval unit 22 is a processor which searches the image DB 3 in response to a retrieval request. The retrieval request includes a keyword which specifies a type as described above. Note that the keyword may be a name of a type or any other thing as long as a type can be specified. For example, the retrieval unit 22 obtains images from the image DB 3 using a first type specified by a retrieval request and a second type relating to the first type as keys.

The storage unit 23 stores a history table and a configuration table. Note that the history table stored in the image retrieval device 2 has a configuration the same as that of the history table 133 stored in the management device 1. The history table stores type IDs and history information which are associated with each other, for example. Note that retrieval history is transmitted from the image retrieval device 2 to the management device 1 at a certain timing. Furthermore, the configuration table stored in the image retrieval device 2 has a configuration the same as that of the configuration table 132 stored in the management device 1. The configuration table stores type IDs and higher-level type IDs which are associated with each other, for example.

Figure 8:
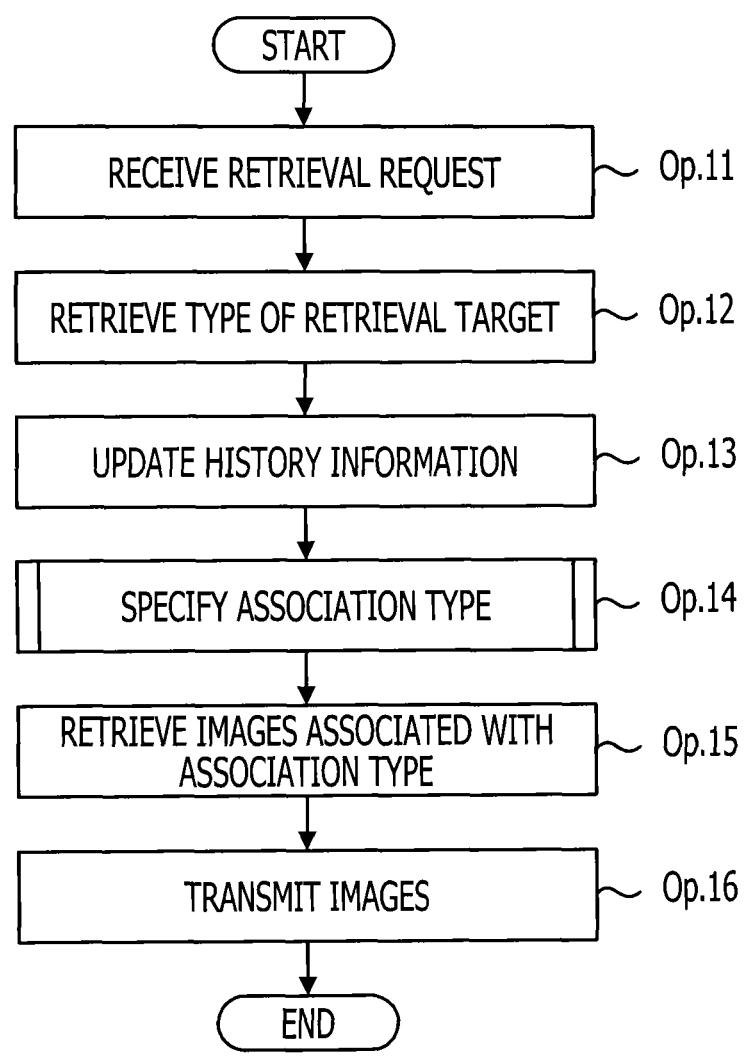
FIG. 8 is a flowchart illustrating a retrieval process.

Next, a process of retrieving images performed by the image retrieval device 2 will be described. FIG. 8 is a flowchart illustrating the retrieval process.

The reception unit 24 receives a retrieval request from the retrieval terminal 6 (in Op. 11). The retrieval unit 22 retrieves images corresponding to a type of a retrieval target in response to the retrieval request (in Op. 12). The retrieval unit 22 obtains image information associated with the type from the image DB 3.

Thereafter, the retrieval unit 22 updates history information of the history table stored in the storage unit 23 (in Op. 13). The retrieval unit 22 adds one to the number of times the retrieval is performed which is managed as the history information corresponding to the type of the retrieval target, for example.

Subsequently, the retrieval unit 22 specifies an association type (in Op. 14). The association type represents a type associated with the type of the retrieval target. For example, the association type represents a type semantically similar to the type of the retrieval target, which will be described in detail hereinafter.

Then the retrieval unit 22 retrieves images associated with the association type (in Op. 15). Specifically, the retrieval unit 22 searches the image DB 3 using the association type as a retrieval key and obtains corresponding image information. The transmission unit 25 transmits the images retrieved in Op. 12 and Op. 15 as retrieval results to the retrieval terminal 6 (in Op. 16). The retrieval results include image information of the retrieved images. Note that the operations in Op. 12 and Op. 15 may be simultaneously performed.

Figure 9:
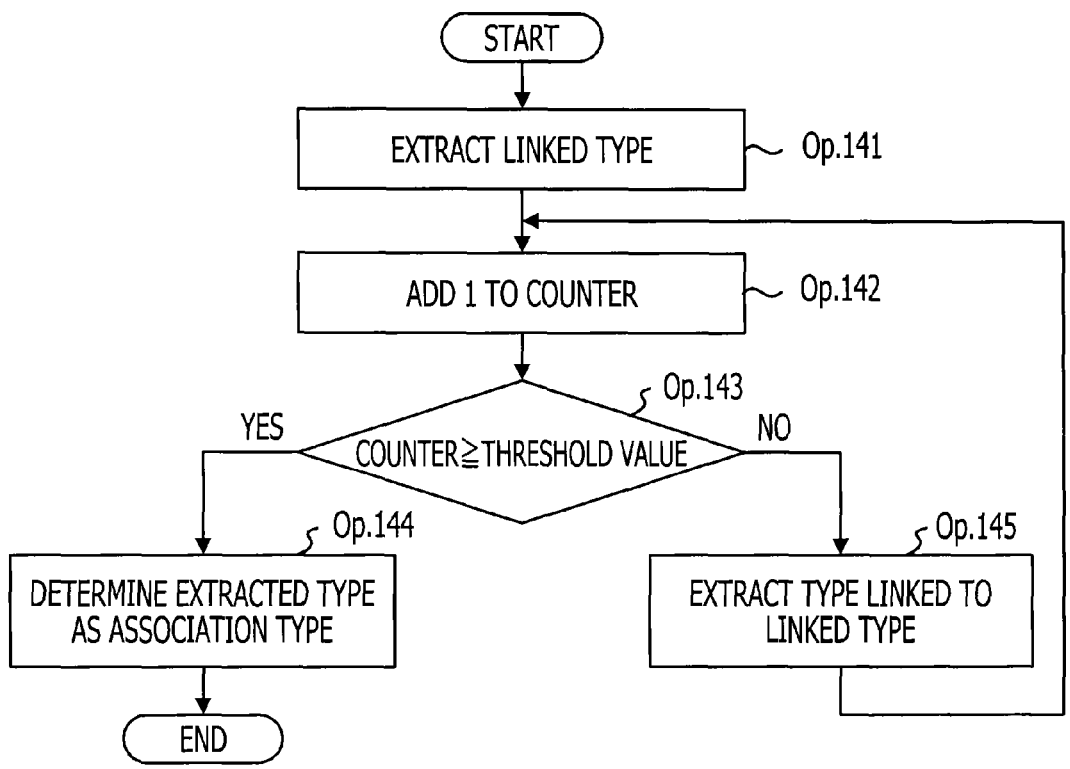
FIG. 9 is a flowchart illustrating a process of specifying an association type.

Here, the operation in Op. 14 will be described with reference to FIG. 9. FIG. 9 is a flowchart illustrating a process of specifying an association type. The retrieval unit 22 extracts a type linked to the type of the retrieval target (in Op. 141). The retrieval unit 22 refers to the configuration table and extracts a type in which a type ID of the retrieval target is a higher-level type ID thereof, for example. Furthermore, the retrieval unit 22 refers to the configuration table and extracts a higher-level type ID corresponding to the type ID of the retrieval target.

When the type of the retrieval target corresponds to the type ID "F", for example, the retrieval unit 22 extracts the higher-level type ID "B" associated with the type ID "F". Furthermore, the retrieval unit 22 extracts the type ID "L" having the higher-level type ID corresponding to the type ID "F". Note that when the tree structure illustrated in FIG. 6 is managed in the configuration table, the type IDs "B", "L", "M", and "N" are extracted as types linked to the type ID "F".

The retrieval unit 22 adds one to a counter (in Op. 142). Note that the counter represents a depth of tracing of a link from the type of the retrieval target. The link represents connection between types in the tree structure. An initial value of the counter is "0".

Subsequently, the retrieval unit 22 compares the counter value with a threshold value (in Op. 143). The threshold value is used to determine an association type. The threshold value is set by the administrator where appropriate.

Note that, in the tree configuration of this embodiment, tracing of a link in a direction of a higher level relative to the retrieval target and tracing of a link in a direction of a lower level relative to the retrieval target are not distinguished from each other and managed by the single counter. However, a counter used when a link is traced in the direction toward a higher level and a counter used when a link is traced in the direction toward a lower level may be different from each other. Then the retrieval unit 22 may compare threshold values in the higher-level direction and the lower-level direction with corresponding counter values in Op. 143.

When the counter value is smaller than the threshold value (in Op. 143: NO), the retrieval unit 22 extracts a type further linked to the extracted linked type (in Op. 145). Note that a method for extracting a second linked type relative to the first linked type is the same as that employed in Op. 141.

On the other hand, when the counter value is equal to or larger than the threshold value (in Op. 143: YES), the retrieval unit 22 specifies the extracted type as an association type (in Op. 144). For example, when the threshold value is "1", the type IDs "B", "L", "M", and "N" extracted in Op. 141 are specified as association types.

By the process described above, the image retrieval device 2 can output images associated with the association types in addition to the images corresponding to the type of the retrieval target as results of the retrieval. It is assumed that, in the image DB 3, the image information corresponding to the type ID "F" of the retrieval target includes six image information items such as "file_100", "file_101", "file_102", "file_103", "file_104", and "file_105". By performing the image retrieval process of this embodiment, image information "file_010" to "file_020" corresponding to the type ID "B" can be supplied to the retrieval terminal 6 as results of the retrieval. Furthermore, image information corresponding to the type IDs "L", "M", and "N" can be supplied to the retrieval terminal 6.

Here, when the type ID "F" corresponds to an unlearned type, in the image DB 3, image information corresponding to the type ID "F" is only associated with images which have been subjected to a type association process performed by the administrator using the classification device 5. Specifically, the classification device 5 is not capable of automatically associating the type ID "F" with image information.

Therefore, when the searcher specifies the type ID "F" in a retrieval request, it is expected that a small number of images are obtained as results of the retrieval. Accordingly, as with the image retrieval process described above, a type relating to the type of the retrieval target is specified and image information corresponding to the association type is also obtained as a result of the retrieval so that a larger number of images can be supplied to the searcher.

Note that, in the image retrieval process, a determination as to whether the type specified by the retrieval request is a learned type may be made after the operation in Op. 11. Then, the image retrieval device 2 may perform the process of specifying an association type only when the type specified by the retrieval request is an unlearned type.

When the type specified by the retrieval request is an unlearned type, it is expected that a small amount of image information corresponding to the type of the retrieval target is included in the image DB 3. Therefore, image information corresponding to the association type is also output as a result of the retrieval so that a larger number of images can be supplied to the searcher. On the other hand, when the type specified by the retrieval request is a learned type, only image information corresponding to the type specified by the retrieval request is supplied to the retrieval terminal 6. Since the image information corresponding to the association type is not included in the result of the retrieval, only images corresponding to the retrieval request issued by the searcher can be supplied.

Figure 10A:
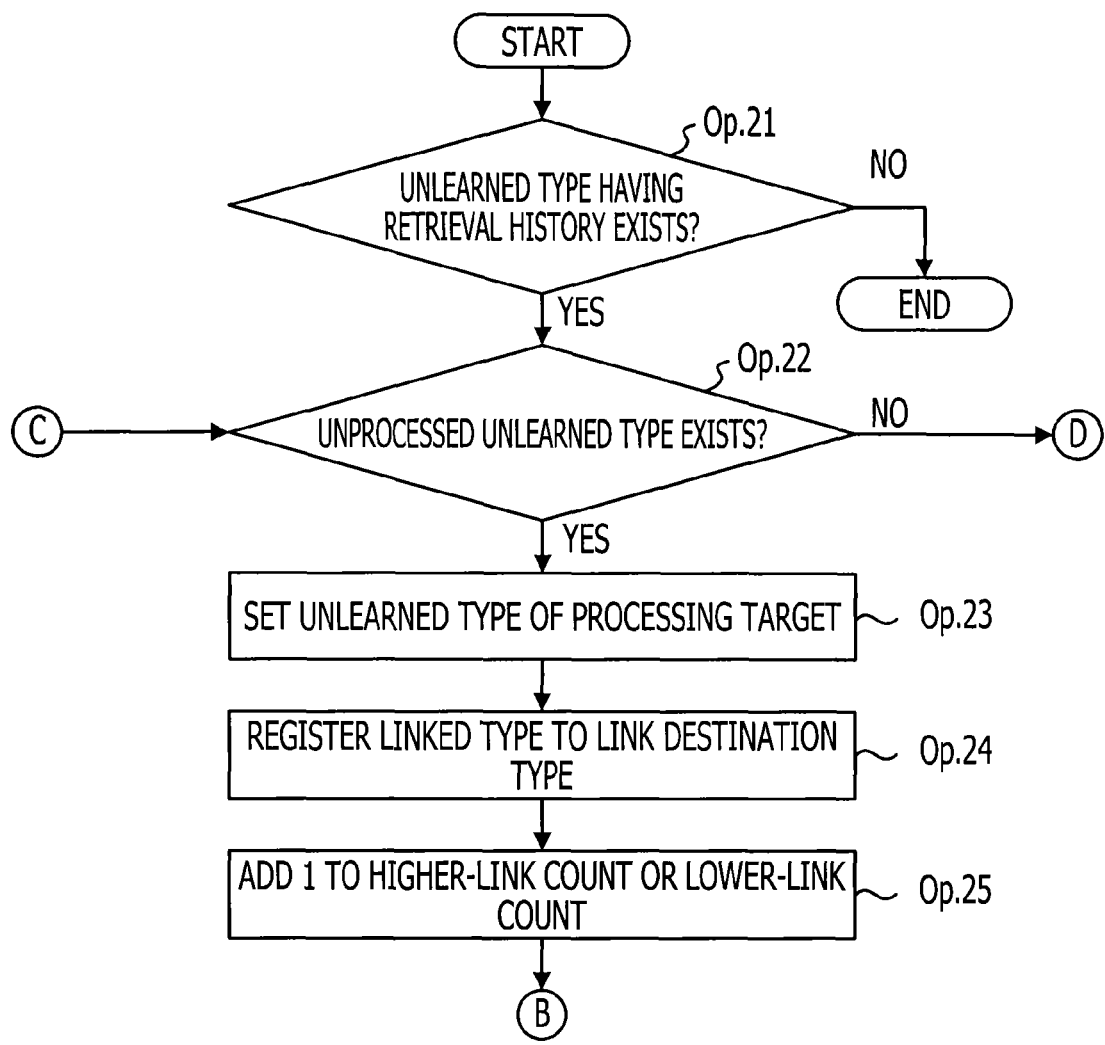
FIGS. 10A, 10B and 10C are a flowchart illustrating a process of managing an image management system.
Figure 10B:
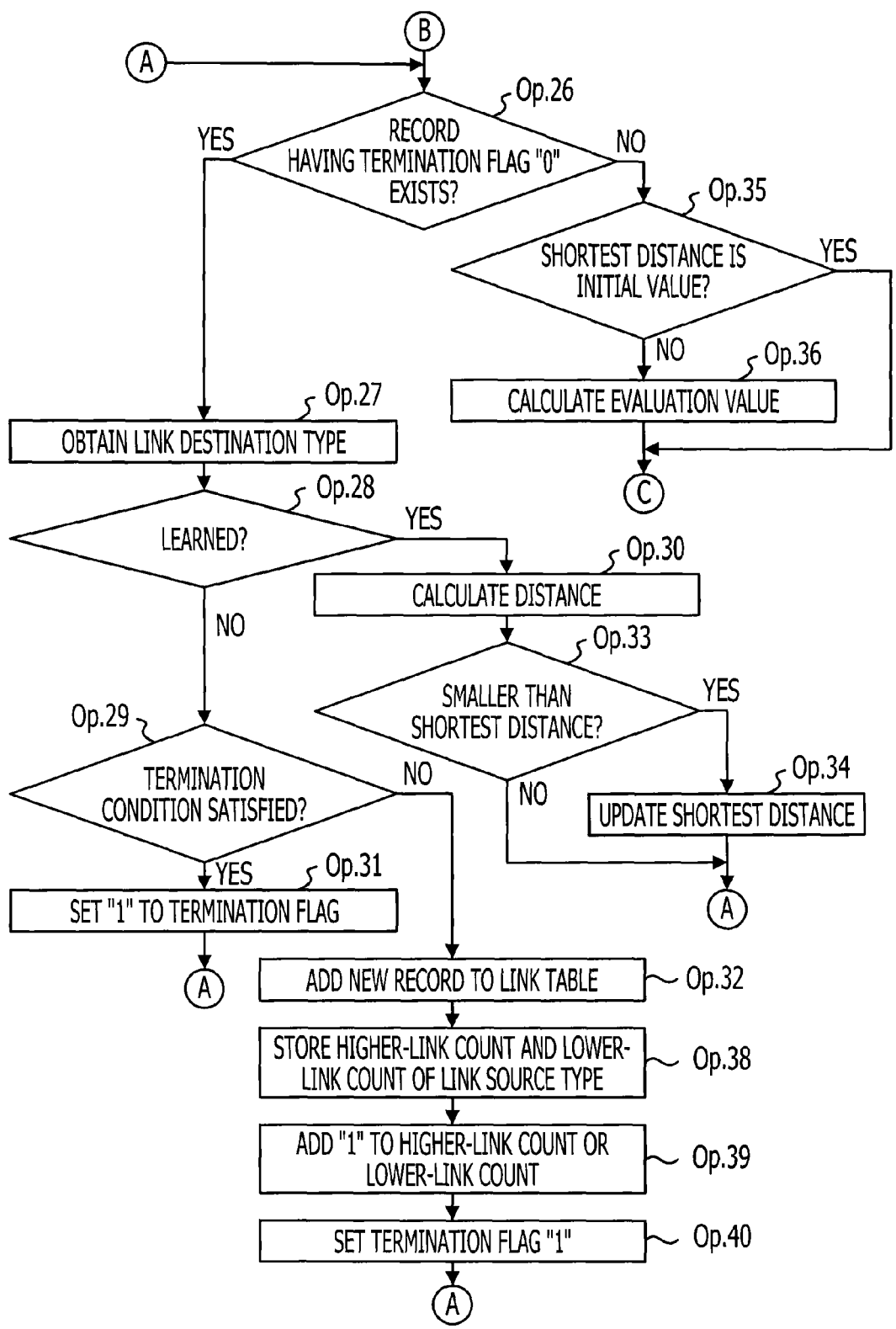
Figure 10C:
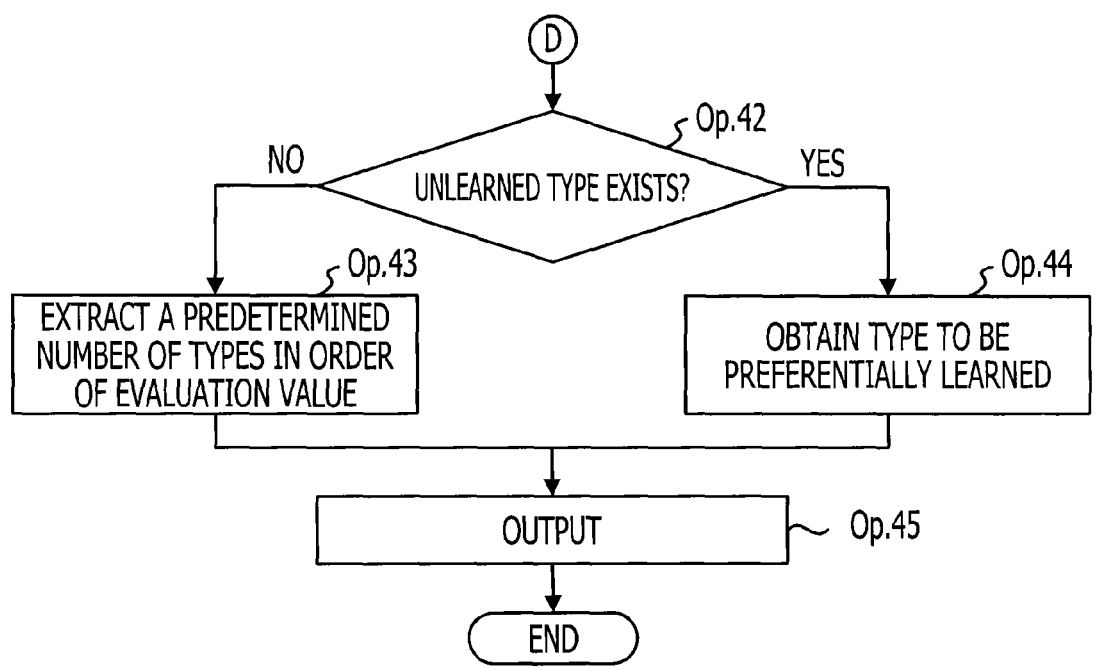

Next, a process of managing the image management system 0 performed by the image retrieval device 1 will be described. FIGS. 10A to 10C are a flowchart illustrating the process of managing the image management system 0. More specifically, in the management process, a type to be preferentially learned is specified from among unlearned types. In response to an instruction issued by the administrator terminal 4, the management device 1 starts the management process.

The controller 12 determines whether an unlearned type which has a certain retrieval history is included with reference to the learning state table 131 and the history table 133 (in Op. 21). Specifically, the controller 12 determines whether at least one of types corresponds to a learning state representing that a feature value has not been obtained and has history information corresponding to a certain condition. For example, the controller 12 determines whether at least one of the types corresponds to the flag "0" as a learning state. Furthermore, when the history information represents the number of times retrieval is performed, the controller 12 determines whether at least one of the types corresponds to the number of times retrieval is performed which is equal to or larger than a certain value.

When an unlearned type is not included (in OP. 21: NO), the controller 12 terminates the management process. On the other hand, when an unlearned type is included (in OP. 21: YES), the controller 12 determines whether an unlearned type which has not been subjected to the management process is included (in OP. 22). Note that the determination as to whether the management process has not been performed is managed by temporarily storing a type of a processing target in a storage region.

When an unlearned type which has not been processed is included (in OP. 22: YES), the controller 12 sets the type of the processing target among unlearned types which have not been processed (in OP. 23). Subsequently, the controller 12 retrieves a type which links to the type of the processing target from the configuration table 132. Thereafter, the linked type is registered in the link table 134 (in Op. 24). Note that a process of retrieving a linked type is the same as that performed in Op. 141.

Here, the link table 134 will be described. FIGS. 11A to 11C and FIGS. 12A and 12B are image diagrams illustrating a table configuration of the link table 134. Note that FIGS. 11A to 11C and FIGS. 12A and 12B represent states in which information stored in the link table 134 is updated as the management process proceeds.

The link table 134 stores link-source type IDs, link-destination type IDs, higher-link counts, lower-link counts, and termination flags which are associated with one another. The link-source type IDs correspond to types serving as starting points when links are traced in the tree structure. The link-destination type IDs correspond to types connected to the types serving as the starting points.

Assuming that the unlearned type "F" is set to be a processing target in Op. 23, the types "B", "L", "M", and "N" are retrieved as linked types. In the link table 134, a record including the link-source type ID corresponding to the type "F" and the link-destination type ID corresponding to the type "B" is added. Furthermore, three records including a record including the link-source type ID corresponding to the type "F" and the link-destination type ID corresponding to the type "L", a record including the link-source type ID corresponding to the type "F" and the link-destination type ID corresponding to the type "M", and a record including the link-source type ID corresponding to the type "F" and the link-destination type ID corresponding to the type "N" are also added. That is, the four records are generated in the link table 134 as illustrated in FIG. 11A.

Information representing the numbers of nodes in a link tracing the tree structure from the type of the processing target in the higher-level direction is stored as the higher-link counts. For example, as illustrated in the configuration table of FIG. 5, the link destination type ID "B" is defined in a node of the link higher than the type "F" of the processing target by "1". Therefore, in the record of the link destination type ID "B", "1" is registered in the higher-link count. Note that "0" is stored in the four records included in the link table 134 illustrated in FIG. 11A as initial states.

Information representing the numbers of nodes in a link tracing the tree structure from the type of the processing target in the lower-level direction is stored as the lower-link counts. For example, as illustrated in the configuration table of FIG. 5, the link destination type ID "L" is defined in a node of the link lower than the type "F" of the processing target by "1". Therefore, in the record of the link destination type ID "L", "1" is registered in the lower-link count. Note that "0" is stored in the four records included in the link table 134 illustrated in FIG. 11A as initial states.

The termination flag stores information representing whether a process of tracing a link performed on a target record is terminated. For example, when the termination flag is "0", the process is not terminated. On the other hand, when the termination flag is "1", the process is terminated. Note that "0" is stored in the four records included in the link table 134 illustrated in FIG. 11A as initial states.

Referring back to FIG. 10A, the controller 12 adds one to the higher-link count or the lower-link count of the link table 134 (in Op. 25). In a combination of a link-source type ID and a link-destination type ID, the controller 12 adds one to the higher-link count or the lower-link count depending on a direction of the trace from the link source type ID (the type of the processing target) to the link destination type ID.

For example, in a case where the type of the processing target is "F", the link table 134 obtained at the time when the operation in Op. 24 is terminated is illustrated in FIG. 11A. Next, although the initial states of the higher-link count and the lower-link count are "0", "1" is added to the higher-link count of the record corresponding to the link destination type ID "B" of FIG. 11A in Op. 25. Specifically, as a record 1300 illustrated in FIG. 11B, a value of the higher-link count "1" and a value of the lower-link count "0" are stored so as to be associated with the link destination type ID "B". Note that the link table 134 at the time when the operation in Op. 25 is terminated is illustrated in FIG. 11B.

After the operation in Op. 25, the controller 12 proceeds to Op. 26 illustrated in FIG. 10B. The controller 12 determines whether at least one of the termination flags of the records represents "0" with reference to the link table 134 (in Op. 26). When at least one of the records has the termination flag representing "0" (in Op. 26: YES), the controller 12 obtains a link-destination type ID from the record having the termination flag representing "0" included in the link table 134 (in Op. 27).

Subsequently, the controller 12 determines whether the obtained link destination type ID has been learned with reference to the learning state table 131 (in Op. 28).

When the obtained link destination type ID has not been learned (in Op. 28: NO), the controller 12 determines whether a termination condition is satisfied (in Op. 29). The termination condition defines a range associated with the type of the processing target. The termination condition is set in advance. For example, an upper limit value of the higher-link count and a lower limit value of the lower-link count are defined. The controller 12 compares the termination condition with the higher-link counts and the lower-link counts stored in the records. Note that a type included in a range of the termination condition from the type of the processing target is referred to as an association type.

Furthermore, the termination condition may be an upper limit value of a sum of the higher-link count and the lower-link count. Furthermore, the termination condition may be the threshold value of a counter value obtained when an association type is specified in the image retrieval device 2.

When the link destination type ID "B" is obtained from the record 1300 illustrated in FIG. 11B, for example, the controller 12 determines whether the type ID "B" has been learned with reference to the learning state table 131. As illustrated in FIG. 4, since the type "B" has not been learned, the controller 12 compares the higher-link count and the lower-link count of the record 1300 illustrated in FIG. 11B with the termination condition in Op. 29.

For example, in a case where the termination condition is an upper limit value "2" of the higher-link count and a lower limit value "2" of the lower-link count, since the higher-link count "1" and the lower-link count "0" of the record 1300 do not satisfy the termination condition, and therefore, a result of the determination represents "NO" in Op. 29.

Note that at least one of the higher-link count and the lower-link count of the link destination type ID of the processing target coincides with a corresponding one of the upper limit value of the higher-link count and the lower limit value of the lower-link count, the controller 12 may obtain an affirmative result of the determination. Alternatively, when the upper limit count and the lower limit count are satisfied, the controller 12 may obtain an affirmative result of the determination.

Next, when the termination condition is not satisfied (in Op. 29: NO), the controller 12 adds a new record to the link table 134 (in Op. 32). The new record has a link source type ID corresponding to the type ID obtained in Op. 27. Then a type ID linked to the new link source type ID is stored as the link destination type ID.

For example, in Op. 27, when the link destination type ID "B" is obtained, the type ID "B" is stored as the link source type ID in the newly added record in Op. 32. Subsequently, the controller 12 retrieves the type IDs "A", "D", and "E" which link to the type ID "B" with reference to the configuration table 132. The controller 12 registers the retrieved type IDs as link destination IDs after associating the type IDs with the link destination type ID "B".

For example, in Op. 32, records 1310, 1320, and 1330 illustrated in FIG. 11C are newly added to the link table 134 illustrated in FIG. 11B. Note that the higher-link counts and the lower-link counts represent "0" in Op. 32. FIG. 11C represents that the higher-link counts and the lower-link counts are updated in Op. 38.

Referring back to the processing flow, the controller 12 obtains the higher-link count and the lower-link count from a record having a type ID which is the same as the link source type ID as a link destination type ID from the link table 134. Thereafter, the controller 12 updates the higher-link counts and the lower-link counts of the newly added records by the obtained values (in Op. 38).

For example, a higher-link count "1" and a lower-link count "0" are obtained form the record 1300 having the link destination type ID corresponding to the link source type ID "B" as illustrated in FIG. 11C. Thereafter, the controller 12 sets "1" to the higher-link counts of the newly added records 1310, 1320, and 1330. Furthermore, the controller 12 sets "0" to the lower-link counts of the newly added records 1310, 1320, and 1330.

Thereafter, the controller 12 adds "1" to the higher-link counts or the lower-link counts of the records added in Op. 32 (in Op. 39). Specifically, the controller 12 refers to the configuration table 132 and adds "1" to a higher-link count when a link source type ID is a higher-level type ID relative to a type ID corresponding to a link destination type ID. On the other hand, the controller 12 refers to the configuration table 132 and adds "1" to a lower-link count when a type ID corresponding to a link destination type ID is a higher-level type ID relative to a link source type ID.

Here, as for the record 1310 illustrated in FIG. 11C, referring to the configuration table 132, the link destination type ID "A" corresponds to the link source type ID "B" serving as a higher-level type ID. Therefore, the controller 12 adds "1" to the higher-link count of the record 1310. In Op. 39, the record 1310 of FIG. 11C is updated to a record 142 of FIG. 12A.

Next, the controller 12 sets a termination flag "1" to a record which includes a type ID which is the same as the link destination type ID obtained in Op. 27 as the link destination type ID (in Op 40). For example, when the link destination type ID "B" is obtained in Op. 27, a termination flag "1" is set to a record 141 including the link destination type ID "B" as illustrated in FIG. 12A. Thereafter, the controller 12 returns to Op. 26.

Furthermore, when the higher-link count and the lower-link count satisfy the termination condition in Op. 29 (Op. 29: YES), the controller 12 sets a termination flag "1" to the record including the link destination type ID obtained in Op. 27 (in Op. 31). Thereafter, the controller 12 returns to Op. 26.

On the other hand, when the link destination type ID has been learned in Op. 28 (Op. 28: YES), a distance from the type of the processing target to the type of the link destination type ID is calculated (in Op. 30). The distance represents an association degree of types. Specifically, the larger the association degree of types becomes, the smaller the distance becomes. On the other hand, the smaller the association degree of types becomes, the larger the distance becomes.

The controller 12 calculates the distance in accordance with the higher-link count and the lower-link count, for example. A sum of the higher-link count and the lower-link count is determined to be a distance, for example. Note that the controller 12 may add a weighted higher-link count and a weighted lower-link count to each other so as to obtain a distance. A larger weight may be added to the higher-link count than the lower-link count.

It is assumed that, every time the controller 12 traces a link, the link table 134 is updated and the link table 134 illustrated in FIG. 12B is obtained. Furthermore, it is assumed that, when the type "C" is obtained from the record 143 of FIG. 12B as a link destination type ID in Op. 27, the type "C" has been learned. In this case, the controller 12 obtains a distance "3" from the type "F" of the processing target to the learned type "C" in accordance with a higher-link count "2" and a lower-link count "1".

Subsequently, the controller 12 compares a value of the shortest distance stored in the distance table 135 with the value of the distance obtained in Op. 30 (in Op. 33). The shortest distance corresponds to the smallest value among distances from the type of the processing target to learned types. When the value obtained in Op. 30 is smaller than the value of the shortest distance (in Op. 33: YES), the controller 12 updates the value of the shortest distance in the distance table 135 by the value obtained in Op. 30 (in Op. 34). Then the process returns to Op. 26. On the other hand, when the value of the shortest distance is not smaller than the value obtained in Op. 30 (in Op. 30: NO), the controller 12 returns to Op. 26.

Here, the distance table 135 will be described. FIG. 13 is an image diagram illustrating a table configuration of the distance table 135. The distance table 135 stores type IDs of unlearned types, shortest distances, and evaluation values which are associated with one another. As the type IDs of the unlearned types, type IDs which are set to be processing targets in Op. 23 are stored.

As the shortest distances, shortest distances from the unlearned types to learned types are stored. Here, initial values of the shortest distances are sufficiently large. For example, "9999" is stored. The shortest distances are appropriately updated in Op. 34. As the evaluation values, values representing degrees of preferential learning of the unlearned types are stored. Note that the evaluation values will be described in detail hereinafter. Initial values of the evaluation values are "0".

It is assumed that the type of the processing target is "F" and a distance "3" from the type "F" of the processing target to the learned type "C" is obtained in Op. 30. In a case where an initial value is stored in the shortest distance of the distance table 135, since the distance "3" is smaller than the initial value "9999" (in Op. 33: YES), the value of the shortest distance of the unlearned type "F" is updated to "3" in the distance table 135 (in Op. 34).

Referring back to the processing flow of the management process, when termination flags of all records included in the link table 134 represent "1" in Op. 26 (in Op. 26: NO), the controller 12 refers to the distance table 135 and determines whether the shortest distance of the unlearned type of the processing target is the initial value (in Op. 35). When the shortest distance of the unlearned type of the processing target is the initial state (in Op. 35: YES), the controller 12 proceeds to Op. 22.

On the other hand, the shortest distance of the unlearned type of the processing target is not the initial state (in Op. 35: NO), the controller 12 calculates an evaluation value (in Op. 36). Thereafter, the controller 12 proceeds to Op. 22 of FIG. 10A.

The evaluation value may be the shortest distance or may be another value based on the shortest distance. An evaluation value Z is calculated in accordance with a shortest distance X and history information Y, for example. When the history information represents the number of times retrieval is performed, calculation is performed as illustrated in Expression (1). Note that "α" and "β" denote values which are appropriately set and correspond to weights for the shortest distance and the history information.

$$(\alpha+X)\cdot(\beta+Y)=Z \quad (1)$$

Furthermore, as the number of learned types is large, a weight may be applied to types in levels lower than the unlearned type of the processing target so that lower evaluation values are obtained for the types in the lower levels. This is because, as the number of learned types is increased in lower levels, it is highly likely that a large number of efficient images are supplied through the retrieval process.

Furthermore, the evaluation value may be obtained taking a collection facility M representing facility of collection of images into consideration. The collection facility M may be an arbitrary value set by the administrator for each type or may be obtained by the management device 1 using a rate of the number of collected images to the number of requested images. The images may be collected using image retrieval through the Internet. Furthermore, the number of requested images corresponds to a number of images used to calculate a highly-reliable feature value. Normally, the number of requested images is several hundreds to several thousands.

Furthermore, a rate of images suitable for calculation of a feature value of a type to the collected images may be taken into consideration to obtain the collection facility M. Since feature values have not been learned, images are not highly reliably collected. Therefore, the images collected through the image retrieval may include images which do not include a target object.

Accordingly, the collection facility M may be obtained by further multiplying the rate of the number of collected images to the number of requested images by a rate of images suitable for calculation of a feature value of a type. Note that the rate of images suitable for calculation of a feature value of a type is obtained when the administrator determines suitable images.

Furthermore, the evaluation value Z may be obtained by taking a learning facility N representing whether collected images are suitable for calculation of a feature value into consideration. The learning facility N is calculated in accordance with variation of features of collected images. It is assumed that the controller 12 calculates a Euclidean distance in accordance with a feature value between images i and j. Then the learning facility N is calculated in accordance with a Euclidean distance ED and Expression (2) below. Note that the larger the Euclidean distance ED becomes, the smaller the learning facility N becomes. In Expression (2), "N" denotes a number of dimensions when the Euclidean distance is calculated and "T" denotes a preset threshold value.

$$N = \sum_i \sum_j a(i,j)/N^2 \quad (2)$$

$$a(i,j) = \begin{cases} 1, & ED \leq T \\ 0, & ED > T \end{cases}$$

The evaluation value Z may be obtained in accordance with the collection facility M and the learning facility N as illustrated in Expression (3). Note that "γ" and "θ" denote preset values in a range from 1 to 0.

$$(\alpha+X)\cdot(\beta+Y)\cdot(\gamma M)\cdot(\theta N)=Z \quad (3)$$

Returning to the description of the processing flow, the controller 12 returns to Op. 22 of FIG. 10A through Op. 36 of FIG. 10B. Thereafter, the process is performed while the type of the processing target is changed until all the unlearned types are processed. When all the unlearned types have been processed (Op. 22: NO), the controller 12 proceeds to Op. 42 of FIG. 10C.

The controller 12 determines whether a type to be learned exists (in Op. 42). For example, the controller 12 determines whether a type having a shortest distance corresponding to the initial value exists with reference to the distance table 135.

Specifically, the fact that a shortest distance is the initial value represents that a learned type is not included in types included in a range which satisfies the termination condition of an unlearned type of a processing target. In other words, association types of the type of the processing target are all unlearned types. Accordingly, the controller 12 determines that feature values of the type of the processing target and the association types are to be preferentially learned, that is, preferentially-learned types, since the type of the processing target and the association types are all unlearned types.

When the preferentially-learned types exist (in Op. 42: YES), the controller 12 obtains type IDs of the preferentially-learned types from the distance table 135 (in Op. 44). On the other hand, when the preferentially-learned types do not exist (in Op. 42: NO), unlearned type IDs corresponding to a certain condition are obtained from the distance table 135 (in Op. 43). For example, the controller 12 obtains a certain number of unlearned type IDs in order of evaluation value.

For example, when the certain condition represents obtainment of an unlearned type in a higher level by one, the controller 12 obtains the unlearned type ID "F" from the distance table 135 illustrated in FIG. 13.

Then the transmission unit 15 transmits types corresponding to the type IDs obtained in Op. 43 or Op. 44 to the administrator terminal 4.

By the process described above, the management device 1 can specify types in which feature values thereof used by the classification device 5 to associate images with types are to be preferentially learned. Specifically, among unlearned types, types which have not been learned and which have unlearned association types are transmitted to the administrator as types in which feature values thereof are to be preferentially learned.

The determination of types to be preferentially learned through the management process is effective in the following case.

In the retrieval process performed by the image retrieval device 2, images corresponding to a type specified by the retrieval request and association types are supplied to the searcher as results of the retrieval. Accordingly, in a case where feature values of the type of the retrieval target and the association types are not obtained, even if the classification device 5 newly obtains an image, the image is not associated with a type before being stored in the image DB 3. It is highly likely that a small number of images are obtained as results of image retrieval performed utilizing the image DB 3.

Therefore, the administrator receives a notification from the management device 1 and calculates feature values of preferentially-learned types in a general method. Thereafter, when the newly-obtained image has a feature corresponding to a feature value which is obtained in advance, the classification device 5 can store a type corresponding to the feature value and the image which are associated with each other in the image DB 3. In addition, it is highly likely that the image retrieval device 2 can transmit a larger number of images to the retrieval terminal 6 as results of the retrieval performed in response to the retrieval request.

Furthermore, when learned types are included in the association types of unlearned types, the management device 1 notifies the administrator of types in which distances from unlearned types to the learned types are longer as types to be preferentially learned. When the image retrieval device 2 returns the images of the type of the retrieval target and the images corresponding to the association types as results of the retrieval, it is possible that an image which corresponds to a type which is most similar to the type specified by the retrieval request is an image desired by the searcher. Accordingly, the management device 1 determines that an unlearned type which is located far from a learned type in distance is to be preferentially learned when compared with an unlearned type which is located near a learned type in distance. The management device 1 can specify a type in which a feature value is to be learned in advance for supplying highly-usable images for the searcher.

Note that, in the management process, although an unlearned type to be output is determined in accordance with a distance in the tree structure, a method for specifying an unlearned type to be preferentially learned is not limited to this. For example, a distance between types may be obtained by digitalizing semasiological proximity between names of the types even when the types are not managed by the tree structure. For example, the management device 1 may digitalize similarity and proximity of meanings of words defined as names as a distance in accordance with the inclusive relationship and the synonym relationship between the words. Then the management device 1 notifies the administrator of an unlearned type having a distance equal to or larger than a threshold value as a type to be preferentially learned.

Figure 14:
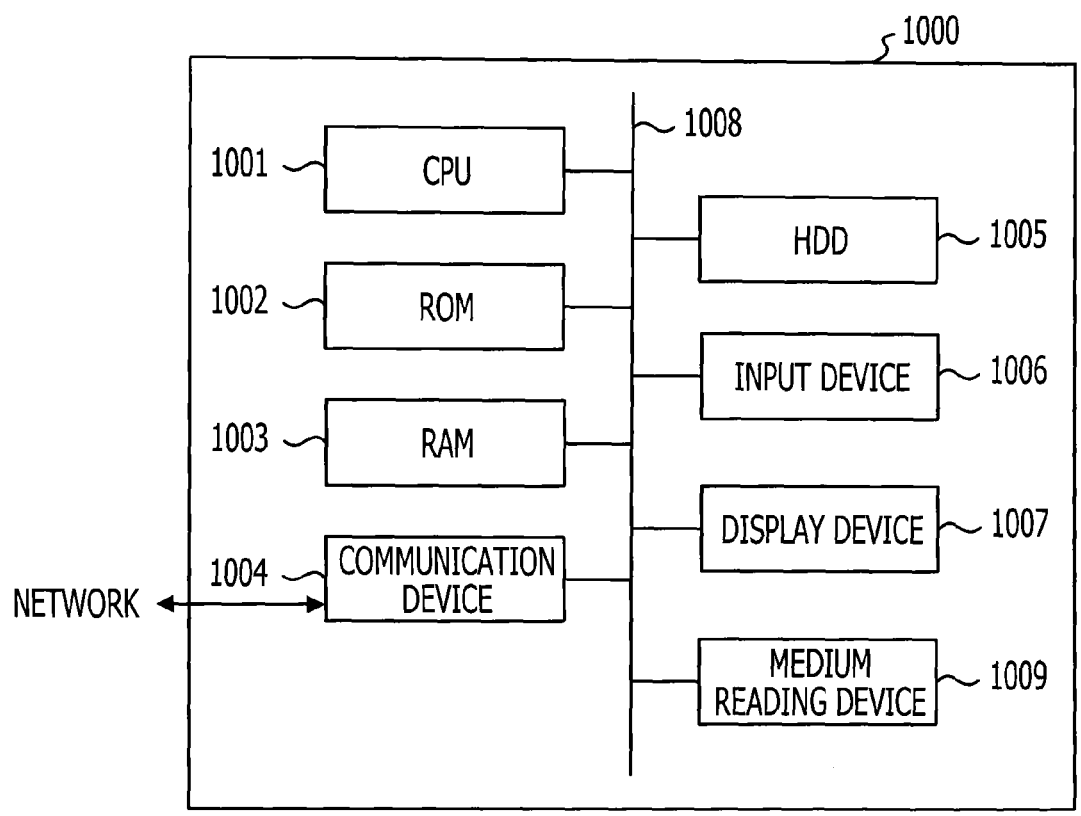
FIG. 14 is a diagram illustrating a hardware configuration of the management device.

FIG. 14 is a diagram illustrating a hardware configuration of the management device 1. A computer 1000 executes the management process described above and functions as the management device 1. The computer 1000 includes a CPU (Central Processing Unit) 1001, a ROM (Read Only Memory) 1002, a RAM (Random Access Memory) 1003, a communication device 1004, an HDD (Hard Disk Drive) 1005, an input device 1006, a display device 1007, and a medium reading device 1009 which are connected to one another through a bus 1008. The units can transmit data to and receive data from one another under control of the CPU 1001.

A management program of the management process illustrated in the flowcharts of the embodiments is stored in a computer readable recording medium. Examples of the computer readable recording medium include a magnetic recording device, an optical disc, a magneto-optical recording medium, and a semiconductor memory. Examples of the magnetic recording device include an HDD, a flexible disk (FD), and a magnetic tape (MT).

Examples of the optical disc include a DVD (Digital Versatile Disc), a DVD-RAM, CD-ROM (Compact Disc-Read Only Memory), and a CD-R (Recordable)/RW (ReWritable). Examples of the magneto-optical recording medium include an MO (Magneto-optical disk). When the program is distributed, portable recording media recording the program, such as DVDs and CD-ROMs, are sold.

The computer 1000 which executes the management program reads the management program from the recording medium storing the management program using the medium reading device 1009. Note that the computer 1000 functions as the management device 1 depending on a read program. The CPU 1001 stores the read program in the HDD 1005, the ROM 1002, or the RAM 1003.

The CPU 1001 is a central processing unit which controls entire operation of the management device 1. The communication device 1004 receives a signal from the administrator terminal 4 or the like through a network and transmits content of the signal to the CPU 1001. Furthermore, the communication device 1004 transmits a signal to the administrator terminal 4 or the like through the network in response to an instruction issued by the CPU 1001.

The HDD 1005 stores programs which cause the computer to execute processes to cause the computer to realize functions the same as those of the management device 1 described in the foregoing embodiments.

When reading the management program from the HDD 1005 and executing the management program, the CPU 1001 functions as the communication unit 11 and the controller 12 illustrated in FIG. 3. Furthermore, the management program may be stored in the ROM 1002 or the RAM 1003 which is accessible by the CPU 1001.

Furthermore, information corresponding to the tables illustrated in FIG. 3 is stored in the HDD 1005 under control of the CPU 1001. As with the program, information corresponding to the data tables of the storage unit may be stored in the ROM 1002 or the RAM 1003 which is accessible by the CPU 1001. Specifically, the data tables of the storage units are stored in a storage device such as the HDD 1005, the ROM 1002, or the RAM 1003. Then the input device 1006 accepts an input of data under control of the CPU 1001. The display device 1007 outputs a variety of information.

On the other hand, the image retrieval device 2 has a hardware configuration the same as that of the management device 1. When a program in which the process illustrated in FIGS. 8 and 9 are described is executed by a computer, the image retrieval device 2 functions.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a procedure for managing a system that retrieves an image corresponding to a first type specified by a retrieval request received from a terminal device and another image corresponding to a second type associated with the first type, from an image database storing a plurality of images associated with at least a number of a plurality of types, the procedure comprising:
   referring to learning state information representing whether feature values of each of the plurality of types have been generated, a feature value being used for storing a new image associated with any one of the plurality of types and indicating features of each of the plurality of types, the plurality of types identifying an object captured in the plurality of images;
   retrieving an unlearned type in which a feature value has not been generated from among the plurality of types, the unlearned type identifying a first object;
   specifying an association type associated with the unlearned type, the association type identifying a second object associated with the first object;
   calculating, when the association type has been learned, a distance between the unlearned type and the association type based on a configuration table, the configuration table defining relationships among the plurality of types in a layer format;
   specifying whether the unlearned type is to be learned based on the calculated distance;
   outputting recommendation information to learn the feature value of the unlearned type, when the specifying specifies that the unlearned type is to be learned; and
   outputting the image to the terminal device, wherein
   the specifying of whether the unlearned type is to be learned is performed prior to the outputting of the image to the terminal device.

2. The non-transitory medium according to claim 1, wherein the outputting of recommendation information includes outputting the unlearned type when all types have not been learned.

3. The non-transitory medium according to claim 1, wherein the procedure further comprises:
   calculating, when the association type has been learned, an evaluation value in accordance with an association degree between the unlearned type and the association type;
   determining whether the unlearned type is to be output in accordance with the evaluation value; and
   outputting the unlearned type as a candidate of learning of a feature value when the unlearned type is determined to be output.

4. The non-transitory medium according to claim 1, wherein the specifying of the association type comprises:
   specifying the association type in which an association degree based on a distance between the unlearned type and a layer is within a certain range.

5. The non-transitory medium according to claim 1, wherein the retrieving of the unlearned type comprises:
   referring to a history table which stores history information indicating history of retrieval performed in a past in the system for each type, and
   retrieving the unlearned type based on the history information and a certain condition.

6. The non-transitory medium according to claim 1, wherein the procedure further comprises:
   obtaining the distance between the unlearned type and the association type by digitalizing semasiological proximity between a name of the unlearned type and a name of the association type.

7. The non-transitory medium according to claim 1, wherein the procedure further comprises:
   obtaining the distance between the unlearned type and the association type by digitalizing similarity and proximity between a name of the unlearned type and a name of the association type.

8. The non-transitory medium according to claim 1, wherein the procedure further comprises:
   calculating a Euclidean distance between the feature value of the unlearned type and a feature value of the association type.

9. A management device which manages a system that retrieves an image corresponding to a first type specified by a retrieval request received from a terminal device and another image corresponding to a second type associated with the first type, from an image database storing a plurality of images associated with at least a number of a plurality of types, the management device comprising:
   a memory configured to store learning state information representing whether feature values of each of the plurality of types have been generated, a feature value being used to store a new image associated with any one of the plurality of types and indicating features of each of the plurality of types, the plurality of types identifying an object captured in the plurality of images; and a processor configured to:
  retrieve an unlearned type in which a feature value has not been generated from among the plurality of types, the unlearned type identifying a first object,
  specify an association type associated with the unlearned type, the association type identifying a second object associated with the first object,
  calculate, when the association type has been learned, a distance between the unlearned type and the association type based on a configuration table, the configuration table defining relationships among the plurality of types in a layer format,
  specify whether the unlearned type is to be learned based on the calculated distance,
  output recommendation information to learn the feature value of the unlearned type, when the unlearned type is to be learned, and
  output the image to the terminal device, wherein
  the specify of whether the unlearned type is to be learned is performed prior to the output of the image to the terminal device.

10. The management device according to claim 9, wherein the processor is further configured to output the unlearned type when all types have not been learned.

11. The management device according to claim 9, wherein the processor is further configured to:
  calculate, when the association type has been learned, an evaluation value in accordance with an association degree between the unlearned type and the association type,
  determine whether the unlearned type is to be output in accordance with the evaluation value, and
  output the unlearned type as a candidate of learning of a feature value when the unlearned type is determined to be output.

12. The management device according to claim 9, wherein the processor is further configured to:
  specify the association type in which an association degree based on a distance between the unlearned type and a layer is within a certain range.

13. The management device according to claim 9, wherein the processor is further configured to:
  refer to a history table which stores history information indicating history of retrieval performed in a past in the system for each type, and
  retrieve the unlearned type based on the history information and a certain condition.

14. A method of managing a system to be executed by a computer, the system retrieving an image corresponding to a first type specified by a retrieval request received from a terminal device and another image corresponding to a second type associated with the first type, from an image database storing a plurality of images associated with at least a number of a plurality of types, the method comprising:

referring to learning state information representing whether feature values of each of the plurality of types have been generated, a feature value being used to store a new image associated with any one of the plurality of types and indicating features of each of the plurality of types, the plurality of types identifying an object captured in the plurality of images;

retrieving an unlearned type in which a feature value has not been generated from among the plurality of types, the unlearned type identifying a first object;

specifying an association type associated with the unlearned type, the association type identifying a second object associated with the first object;

calculating, when the association type has been learned, a distance between the unlearned type and the association type based on a configuration table, the configuration table defining relationships among the plurality of types in a layer format;

specifying whether the unlearned type is to be learned based on the calculated distance;

outputting recommendation information to learn a feature value of the unlearned type, when the specifying specifies that the unlearned type is to be learned; and outputting the image to the terminal device, wherein the specifying of whether the unlearned type is to be learned is performed prior to the outputting of the image to the terminal device.

15. The method for managing a system according to claim 14, wherein the outputting of recommendation information includes outputting the unlearned type when all types have not been learned.

16. The method for managing a system according to claim 14, further comprising:
  calculating, when the association type has been learned, an evaluation value in accordance with an association degree between the unlearned type and the association type;
  determining whether the unlearned type is to be output in accordance with the evaluation value; and
  outputting the unlearned type as a candidate of learning of a feature value when the unlearned type is determined to be output.

17. The method for managing a system according to claim 14, wherein the specifying of the association type comprises:
  specifying the association type in which an association degree based on a distance between the unlearned type and a layer is within a certain range.

18. The method for managing a system according to claim 14, wherein the retrieving of the unlearned type comprises:
  referring to a history table which stores history information indicating history of retrieval performed in a past in the system for each type, and
  retrieving the unlearned type based on the history information and a certain condition.

* * * * *